(12) United States Patent
Drury (10) Patent No.: US 8,824,897 B2
(45) Date of Patent: Sep. 2, 2014

(54) OPTICAL NETWORK SYSTEMS AND METHODS FOR OPERATING SAME

(75) Inventor: David Markham Drury, Pittsburgh, PA (US)

(73) Assignee: Accipiter Systems, Inc., Pittsburgh, PA (US)

(*) Notice: Subject to any disclaimer, the term of this patent is extended or adjusted under 35 U.S.C. 154(b) by 364 days.

(21) Appl. No.: 12/477,576

(22) Filed: Jun. 3, 2009

(65) Prior Publication Data

US 2009/0304383 A1 Dec. 10, 2009

Related U.S. Application Data

(60) Provisional application No. 61/058,807, filed on Jun. 4, 2008.

(51) Int. Cl.
*H04B 10/00* (2013.01)
(52) U.S. Cl.
USPC ........... 398/135; 398/136; 398/137; 398/138; 398/139
(58) Field of Classification Search
CPC ....... H04J 14/00; H04J 14/02; H04J 14/0227; H04J 14/0241; H04J 14/0278; H04J 14/0279; H04J 14/028; H04J 14/0283
See application file for complete search history.

(56) References Cited

U.S. PATENT DOCUMENTS

| | | |
|---|---|---|
| 5,319,642 A | 6/1994 | Ota |
| 6,477,294 B1 | 11/2002 | Jansen Van Doorn et al. |
| 6,480,644 B1 | 11/2002 | MacDonald |
| 6,738,582 B1 | 5/2004 | Moshe et al. |
| 7,042,883 B2 | 5/2006 | Fan et al. |
| 7,050,663 B2 | 5/2006 | Nikonov et al. |
| 7,272,309 B1 | 9/2007 | Tamil et al. |
| 7,289,439 B2 | 10/2007 | Lee et al. |
| 7,349,629 B1 | 3/2008 | Soderberg et al. |
| 7,889,723 B2 | 2/2011 | Beshai et al. |
| 8,218,965 B1 | 7/2012 | Uhlhorn et al. |

(Continued)

FOREIGN PATENT DOCUMENTS

| | | |
|---|---|---|
| WO | 2005125264 A1 | 12/2005 |
| WO | WO 2005/125264 A1 | 12/2005 |

OTHER PUBLICATIONS

Yoo et al., A High Speed Protocol for Bursty Traffic in Optical Networks, SPIE's All-Optical Communication Systems: Architecture, Control and Protocol Issues, (Nov. 1997), 3230:79-90.

(Continued)

*Primary Examiner* — Darren E Wolf
(74) *Attorney, Agent, or Firm* — Pepper Hamilton LLP (57) ABSTRACT

A system for transmitting data packets over a network. The system includes a plurality of first nodes, wherein each first node has a first transceiver configured to transmit a data packet at at least one of a plurality of first wavelengths and receive a data packet at an assigned first wavelength, wherein each first node is configured to pass incoming data packets not transmitted at the assigned first wavelength, a plurality of second nodes, wherein each second node has a second transceiver configured to transmit a data packet at least one of a plurality of second wavelengths and receive a data packet at an assigned second wavelength, wherein each second node is configured to pass incoming data packets not transmitted at the assigned second wavelength, and at least one optical fiber operably connecting the transceivers.

12 Claims, 6 Drawing Sheets

(56) References Cited

U.S. PATENT DOCUMENTS

| | | | |
|---|---|---|---|
| 8,369,706 | B2 | 2/2013 | Sorin |
| 2002/0131441 | A1 | 9/2002 | Trachewsky et al. |
| 2002/0154357 | A1* | 10/2002 | Ozveren et al. ............... 359/124 |
| 2003/0063348 | A1 | 4/2003 | Posey et al. |
| 2003/0185229 | A1 | 10/2003 | Shachar et al. |
| 2004/0037301 | A1 | 2/2004 | Sachar et al. |
| 2004/0076434 | A1 | 4/2004 | Whittaker et al. |
| 2004/0126057 | A1 | 7/2004 | Yoo |
| 2005/0147411 | A1 | 7/2005 | Hamou et al. |
| 2005/0174639 | A1 | 8/2005 | Zalevsky et al. |
| 2005/0207427 | A1 | 9/2005 | Su et al. |
| 2005/0213995 | A1 | 9/2005 | Lee et al. |
| 2006/0159455 | A1* | 7/2006 | Drury et al. ..................... 398/51 |
| 2006/0198299 | A1 | 9/2006 | Brzezinski et al. |
| 2006/0257143 | A1 | 11/2006 | Cavazzoni et al. |
| 2007/0110439 | A1 | 5/2007 | Beshai et al. |
| 2007/0121664 | A1 | 5/2007 | Szczebak, Jr. et al. |
| 2007/0242625 | A1 | 10/2007 | Dunne et al. |
| 2007/0285843 | A1 | 12/2007 | Tran |
| 2009/0074414 | A1 | 3/2009 | Miles et al. |
| 2009/0232497 | A1 | 9/2009 | Archambault et al. |
| 2010/0165997 | A1 | 7/2010 | Matsumoto |
| 2010/0188734 | A1 | 7/2010 | Grudinin et al. |
| 2010/0296812 | A1 | 11/2010 | Asghari |
| 2011/0008043 | A1 | 1/2011 | Nomura et al. |
| 2012/0033968 | A1 | 2/2012 | Testa et al. |
| 2012/0128354 | A1 | 5/2012 | Panwar et al. |
| 2012/0293856 | A1 | 11/2012 | Onaka |
| 2013/0089322 | A1 | 4/2013 | Ohlen |

OTHER PUBLICATIONS

Cotter et al., "Asynchronous Digital Optical Regeneration and Networks", Dec. 1998, Journal of Lightwave Technology. 16(12):2068-2080.

Guillemot et al., "Transparent Optical Packet Switching: The European ACTS KEOPS Project Approach", Dec. 1998, Journal Lightwave Technology. 16(12):2117-2134.

Hunter et al., "WASPNET: A Wavelength Switched Packet Network", Mar. 1999, IEEE Communications Magazine pp. 120-129.

Wonglumsom et al., "HORNET—A Packet-Switched WDM Network: Optical Packet Transmission and Recovery", Dec. 1999, IEEE Photonics Technology Letters 11(12):1692-1694.

Carena et al., "OPERA: An Optical Packet Experimental Routing Architecture with Label Swapping Capability," Dec. 1998, J. Lightwave Technology 16(12):2135-2145.

Masetti et al., "High Speed, High Capacity ATM Optical Switches for Future Telecommunication Transport Networks", Jun. 1996, IEEE Journal Selected Areas in Communications 14(5):979-998.

Chiaroni et al., "Physical and Logical Validation of a Network Based on All-Optical Packet Switching Systems", Dec. 1998, Journal Lightwave Technology 16(12):2255-2264.

Hunter et al., "Approaches to Optical Internet Packet Switching", Sep. 2000, IEEE Communications Magazine pp. 116-122.

Vaughn et al., "All-Optical Updating of Subcarrier Encoded Packet Headers with Simultaneous Wavelength Conversion of Baseband Payload in Semiconductor Optical Amplifiers", 1997, IEEE Photonics Technology Letters 9(6):827-829.

Chlamtac et al., "CORD: Contention Resolution by Delay Lines", Jun. 1996, IEEE Journal on Selected Areas in Communications 14(5):1014-1029.

Hunter et al., "Buffering in Optical Packet Switches", Dec. 1998, Journal Lightwave Technology 16(12):2081-2094.

Hunter et al., "SLOB: A Switch with Large Optical Buffers for Packet Switching", Oct. 1998, J. Lightwave Technology 16(10):1725-1736.

Yao et al., "Advances in Photonic Packet-Switching: An Overview", Feb. 2000, IEEE Communications Magazine pp. 84-93.

Qiao et al., "Optical Burst Switching (OBS)—A New Paradigm for an Optical Internet", Mar. 1999, in a special issue of J. High Speed Networks (JHSN) on WDM Networks, vol. 8(1):69-84.

Yoo et al., "A High Speed Protocol for Bursty Traffic in Optical Networks", SPIE's All—Optical Communication Systems: Architecture, Control and Protocol Issues, vol. 3230:79-90.

Dolzer et al., "Evaluation of Reservation Mechanisms for Optical Burst Switching", Jan. 2001, AEU International Journal Electronics and Communications, 55(1).

Chaskar, et al., "A Framework to Support IP over WDM Using Optical Burst Switching", Jan. 2000, Journal on Selected Areas in Communication, pp. 1-10.

Yoo et al., "Optical Burst Switching for Service Differentiation in the Next-Generation Optical Internet", Feb. 2001, IEEE Communications Magazine, pp. 98-104.

Qiao, "Labeled Optical Burst Switching for IP-over-WDM Integration", Sep. 2000, IEEE Communications Magazine pp. 104-114.

Yoo et al., "The Effect of Limited Fiber Delay Lines on QoS Performance of Optical Burst Switched WDM Networks", Jun. 2000, International Conference on Communication ICC, pp. 974-979.

Huang et al., "Dynamically reconfigurable optical packet switch (DROPS)", Dec. 2006, Optics Express, 14(25), pp. 12008-12014.

* cited by examiner

OPTICAL NETWORK SYSTEMS AND METHODS FOR OPERATING SAME

CROSS REFERENCE TO RELATED PATENTS

This patent application claims priority to, and incorporates by reference in its entirety, U.S. Provisional Application No. 61/058,807 entitled "Optical Network Systems and Methods for Operating Same" and filed Jun. 4, 2008.

BACKGROUND

The disclosed embodiments generally relate to the fields of optical networks, data switching and data routing.

In recent history, telecommunication systems and data networking systems have rapidly grown in size, speed and capacity. Accompanying the growth of these systems, however, has been the cost of maintaining these systems. A typically local area network (LAN) requires a large and costly infrastructure. For example, groups of servers must be included in the LAN to handle requests from users of the LAN, direct these requests accordingly, maintain various shared files and other resources, and provide a gateway to other networks, e.g., the Internet. In addition to the servers, each LAN must have a series of routers and switches to direct traffic generated by the users of the LAN. The servers, switches and routers, as well as the user's computers must all be connected via cables or wireless connections. These various devices and connections all require significant power, cooling, space and financial resources to ensure proper functionality.

Recently, fiber optic cables have been used to replace standard coaxial or copper based connections in communication networks. Fiber optic cables typically use glass or plastic optical fibers to propagate light through a network. Specialized transmitters and receivers utilize the propagated light to send data through the fiber optic cables from one device to another. Fiber optic cables are especially advantageous for long-distance communications, because light propagates through the fibers with little attenuation compared to electrical cables. This allows long distances to be spanned with few repeaters, thereby reducing the costs of the communication networks.

In fiber-optic communications, wavelength-division multiplexing (WDM) is a technology that multiplexes multiple optical carrier signals on a single optical fiber by using different wavelengths of light to carry different signals. WDM allows for a multiplication in capacity, in addition to enabling bidirectional communications over one strand of fiber.

A WDM system typically uses a multiplexer to join multiple optical carrier signals together at a transmitter, and a demultiplexer at the receiver to split the multiplexed signal into its original optical carrier signals. WDM systems are generally broken into three different wavelength patterns: conventional, coarse and dense.

Dense Wavelength Division Multiplexing ("DWDM") refers to optical signals multiplexed within the 1550-nm band. Conventional networks employing DWDM have operated between about 1530 nm and about 1565 nm because conventional fiber optic cables exhibited the best characteristics in this range. More recently developed fiber optic cables, such as Corning's SMF 28e, which is designed for use in metropolitan area networks (MANs), are able to support wavelengths ranging from about 1260 nm to about 1625 nm (about 238,095 GHz to about 184,615 GHz).

Similar to the above discussed WDM system, a DWDM system typically includes several components. First, a DWDM terminal multiplexer is typically used to receive any input carrier signals, convert the carrier signals to an appropriate wavelength, and multiplex the signals into a single multiplexed signal for transmission. Another component, depending on the size of the DWDM system, is an intermediate optical terminal. An intermediate optical terminal is used to remotely amplify the multiplexed signal. Typically, at about 140 kilometers, fiber optic signal quality begins to diminish, and an optical terminal may be used to strengthen the signal. A third typical component is a DWDM terminal demultiplexer. The DWDM terminal demultiplexer breaks the multiplexed signal back into individual signals at a receiver, and outputs the various individual signals on separate fibers for client-level systems.

Table 1 provides a list of band designations specified by the International Telecommunication Union for the main transmission regions of fiber optic cables and the wavelength ranges covered by each transmission region. Typically, DWDM falls into the 1530-1565 nm range, however, as mentioned above, advances in materials and construction methods for optical fibers has increased this range to nearly the entire range of main transmission regions, i.e., 1260-1625 nm.

TABLE 1

ITU Standard Optical Band Definitions

| Band | Descriptor | Wavelength Range |
| --- | --- | --- |
| O band | Original | 1260-1360 nm |
| E band | Extended | 1360-1460 nm |
| S band | Short Wavelength | 1460-1530 nm |
| C band | Conventional | 1530-1565 nm |
| L band | Long Wavelength | 1565-1625 nm |
| U band | Ultralong Wavelength | 1625-1675 nm |

Conventional optical modulation schemes are based on Non-Return-to-Zero (NRZ) algorithms, which deliver 1 bit per Hz used. In a modulation scheme based on an NRZ algorithm, the value one is represented by a first significant condition (e.g., a positive voltage or light on), and a zero is represented by a second significant condition (e.g., a negative voltage or light off). Because such a modulation scheme has no rest or neutral position between bits, the bandwidth used is significantly reduced. However, NRZ algorithms are not inherently self-synchronizing. Synchronization errors may occur during a long string of consecutive values (e.g., a long string of ones or zeroes). An additional synchronization technique (such as a run length limited constraint or a parallel synchronization signal) can be used to avoid any potential bit slip or other synchronization errors.

Current optical systems can also employ more complex coding schemes, such as Duo binary (commonly used for 40 Gbps optical DWDM systems), which encodes 2 bits/Hz. In Duo binary modulation schemes, the value one is represented by two separate significant conditions (e.g., both a positive and a negative voltage), and the value zero is represented by a third significant condition (e.g., a zero net voltage). The Duo binary encoding scheme provides for a rapid fluctuation in voltage, thereby reducing the build-up of any direct current in a transmission signal, allowing the transmission signal to be transmitted over longer distances without signal degradation.

As communication systems grow and fiber optic systems become more integrated into standard communications, the speed and resultant cost of individual network components is also growing. Huge investments must be made by telecommunication companies to keep up with consumer demand as well as technological developments. As a result, telecommunication companies, as well as business running their own communication networks, would benefit greatly from network components with reduced space, weight, cost and power requirements. However, development has progressed slowly in this area. Instead, network components have become bigger and heavier and consume more power in the pursuit of supplying higher bandwidth.

In atypical environments, such as airborne or shipborne networks, space, weight and power become even more important for network design. However, the lack of progress in reducing the space, weight and power of network components described above has restricted the availability of high-bandwidth networks in such environments.

For example, space is at a premium on most airplanes and smaller ships. As such, network components of the size used in most business environments could exceed the available storage space in aerospace or naval environments. Data networks capable of providing on-demand video and audio programming to airplane passengers have developed slowly at least because of the size of conventional networking equipment. Similarly, military aircraft often require high-speed communication between subsystems or are used as a flying communication hub. However, conventional networking equipment is limited in its ability to perform this task because of the limited footprint that can be provided to all functions in an aircraft.

In addition, the weight of a network component has a direct effect on fuel consumption in airborne or shipborne environments because the added weight increases the drag on the airplane or ship. Similarly, the amount of power consumed by network components directly affects fuel consumption since power in airborne and shipborne environments is generated within the environment itself. For ships that are at sea for long periods of time, the power consumed by conventional networking equipment inhibits the ability to use such equipment because of the drain on limited energy reserves.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "packet" is a reference to one or more packets and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In one general respect, the embodiments disclose a system for transmitting data packets over an optical network. The system includes a plurality of first nodes, wherein each first node has a first transceiver configured to transmit a data packet at least one of a plurality of first wavelengths and receive a data packet at an assigned first wavelength, wherein each first node is configured to pass incoming data packets not transmitted at the assigned first wavelength, a plurality of second nodes, wherein each second node has a second transceiver configured to transmit a data packet at least one of a plurality of second wavelengths and receive a data packet at an assigned second wavelength, wherein each second node is configured to pass incoming data packets not transmitted at the assigned second wavelength, wherein the plurality of second wavelengths are mutually exclusive from the plurality of first wavelengths, and at least one optical fiber operably connecting the first transceivers and the second transceivers. The system is configured so that each of the first and second transceivers is connected such that the transceiver can only directly transmit a data packet through the at least one optical fiber to one receiving transceiver.

In another general respect, the embodiments disclose a system for transmitting data packets over an optical network. The system includes a plurality of nodes, wherein each node has a first transceiver configured to transmit a data packet at least one of a plurality of first wavelengths and receive a data packet at an assigned first wavelength, wherein each node is configured to pass incoming data packets not transmitted at the assigned first wavelength, a plurality of bridge/routers, wherein each bridge/router has a second transceiver configured to transmit a data packet at one or more of the plurality of first wavelengths and a plurality of second wavelengths, receive a data packet at an assigned first wavelength, and receive a data packet at an assigned second wavelength, wherein each bridge/router is configured to pass incoming data packets not transmitted at the assigned first wavelength or the assigned second wavelength, wherein the plurality of second wavelengths are mutually exclusive from the plurality of first wavelengths, and at least one optical fiber operably connecting the first transceivers and the second transceivers. The system is configured so that each of the first and second transceivers is connected such that the transceiver can only directly transmit a data packet through the at least one optical fiber to one receiving transceiver.

In another general respect, the embodiments disclose a system for transmitting data packets over an optical network. The system includes a plurality of fiber networks, wherein each fiber network comprises a plurality of nodes and at least one optical fiber operably connecting the plurality of nodes, wherein each node comprises a transceiver configured to transmit a data packet at one or more of a plurality of wavelengths associated with the fiber network and receive a data packet at one of the plurality of wavelengths that is associated with the node and a bridge/router comprising a plurality of transceivers, wherein each transceiver is associated with a corresponding fiber network, wherein each transceiver is configured to receive a data packet at a wavelength associated with the corresponding fiber network and transmit a data packet at one or more of a plurality of wavelengths associated with the corresponding fiber network.

BRIEF DESCRIPTION OF THE DRAWINGS

Aspects, features, benefits and advantages of the present invention will be apparent with regard to the following description and accompanying drawings, of which.

DETAILED DESCRIPTION

The following terms shall have, for the purposes of this application, the respective meanings set forth below.

A "node" refers to a processor-based system configured to transmit and receive information from one or more other nodes via a network. For example, a node may be a Terabit Optical Ethernet node that transmits to one or more destination nodes by varying the frequency of its transmissions to match a frequency at which a particular destination node receives packets.

A "node group" refers to a plurality of nodes that can interoperate on a single fiber. A node group may share a set of characteristics, such as using the same wavelength range, supporting the same wavelength spacing (which with the wavelength range defines the maximum number of nodes in the node group), supporting the same wavelength base point, and supporting the same physical layer protocol. In other words, a node group is a plurality of nodes that can interoperate on a single fiber.

A "bridge/router" refers to a node that provides bridging and/or routing functionality between a plurality of node groups. A bridge/router may have a transceiver for each node group for which it provides bridging and/or routing functionality.

A "gateway" refers to a bridge/router that provides inter-connectivity between or among a plurality of networks.

Terabit Optical Ethernet ("TOE") is a network architecture and transmission protocol that may be used to implement local, wide and/or metropolitan area networks. An exemplary TOE network may be found in U.S. patent application Ser. No. 11/334,617 entitled "Method and System for Interconnecting End Systems over an Optical Network," the contents of which are incorporated by reference in their entirety. TOE may transmit 100 s of terabits of information per second over single mode fibers. TOE is a highly scalable architecture allowing controlled access to a common shared fiber media.

Using TOE, an end system and/or an end system concentrator may directly access the shared media and may communicate with all other systems and/or concentrators throughout the system. Thousands of end nodes and/or end node concentrators may be supported with a total throughput exceeding 100 Tbps. In addition, the shared media utilized by TOE may replace the huge investment required for physical infrastructure as a result of link/switch architectures common in conventional LANs.

TOE resolves these problems by permitting a dramatic reduction in capital expenditure because most system elements are replaced by the fiber. Moreover, power, cooling and housing costs are dramatically reduced as a result of the reduction in physical infrastructure. TOE also reduces the complexity of a network because all local devices can share the same media, which eliminates the complexity of conventional routing systems. In addition, TOE is easily scalable and can benefit from increases in optical technologies for improved bandwidth over time. TOE may be designed to carry Ethernet traffic by providing Ethernet interfaces to connected computer systems. Although current technologies are limited to 10 Gbps Ethernet systems, TOE may readily accommodate future advances. TOE and methods of using TOE to reduce network costs by interfacing various computer systems are discussed below with reference to the figures.

A TOE network may include at least two basic elements: a plurality of nodes and an optical fiber. Each node may include one or more transceivers used to access the optical fiber. An optical transceiver may be an integrated circuit configured to transmit and receive a signal via an optical fiber. An optical fiber is typically a glass or plastic tube configured to carry an optical signal. In an exemplary TOE network, an optical fiber may be used to link two nodes together.

Figure 1A:
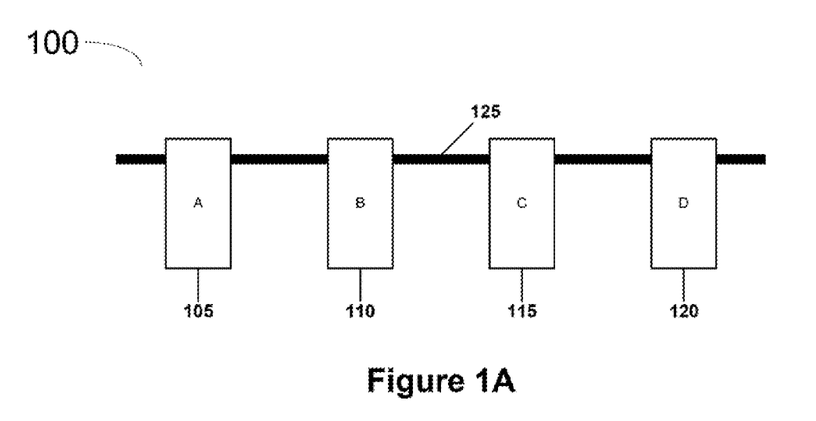
FIG. 1A illustrates a system level diagram of an exemplary network architecture according to an embodiment.

FIG. 1A illustrates a system level diagram of an exemplary TOE network 100. TOE network 100 may include four nodes 105, 110, 115 and 120 interconnected by an optical fiber 125. Each node is associated with a specific wavelength. The wavelength for each node determines which transmissions the node receives and which transmissions are passed to the next node. For example, in TOE network 100, node 105 may be associated with wavelength A, node 110 may be associated with wavelength B, node 115 may be associated with wavelength C, and node 120 may be associated with wavelength D. In one embodiment, TOE nodes may be associated with wavelengths in the infrared spectrum. However, other wavelengths may also be used as will be apparent based on the teachings of the present disclosure.

Figure 1B:
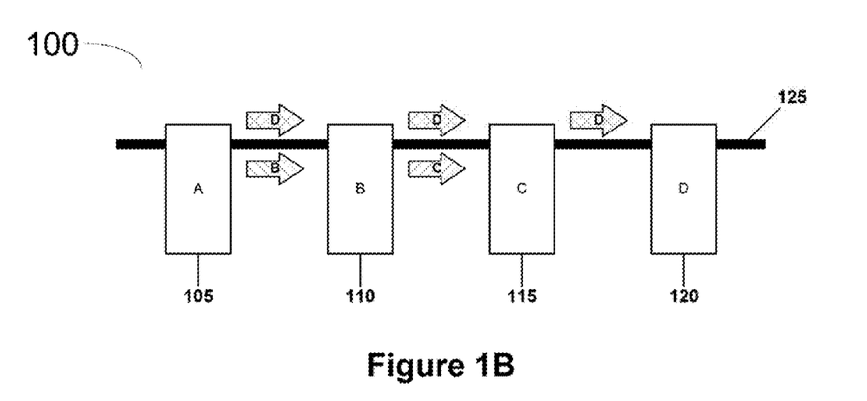
FIG. 1B illustrates exemplary transmissions of data from one node to another according to an embodiment.

In order for one node to transmit data to another node, the node must label the data with the wavelength associated with the required destination. FIG. 1B illustrates exemplary transmissions of data from one node to another through TOE network 100. As shown in FIG. 1B, node 105 may send a first packet to node 110 by transmitting the packet at wavelength B corresponding to node 110. Node 105 may also send a second packet to node 120 by transmitting the second packet at wavelength D corresponding to node 120. In addition, node 110 may transmit a third packet to node 115 by transmitting the third packet at wavelength C corresponding to node 115. Each node may pass received packets that are not transmitted at the wavelength corresponding to the node to the next node. As such, each node is optically transparent to, or configured to ignore data packets transmitted on, all wavelengths other than its allocated wavelength, while the destination node intercepts all packets transmitted at its wavelength.

For example, node 105 may send a packet intended for node 120 at wavelength D. Node 110 may pass the packet along because node 110 only receives packets sent at wavelength B. Similarly, node 115 may pass the packet along because node 115 only receives packets sent at wavelength C. Node 120 may receive the packet sent at wavelength D and may intercept the packet for further processing. This arrangement may provide for a network infrastructure utilizing a single optical fiber while reducing the hardware at each node because a multiplexer and demultiplexer are not necessary to receive individual signals.

In order to support transmissions at multiple wavelengths, each node may be able to change the wavelength at which it transmits on a packet by packet basis. Exemplary systems for transmitting using multiple wavelengths include electronically tunable lasers or systems using multiple lasers at each node.

Figure 2:
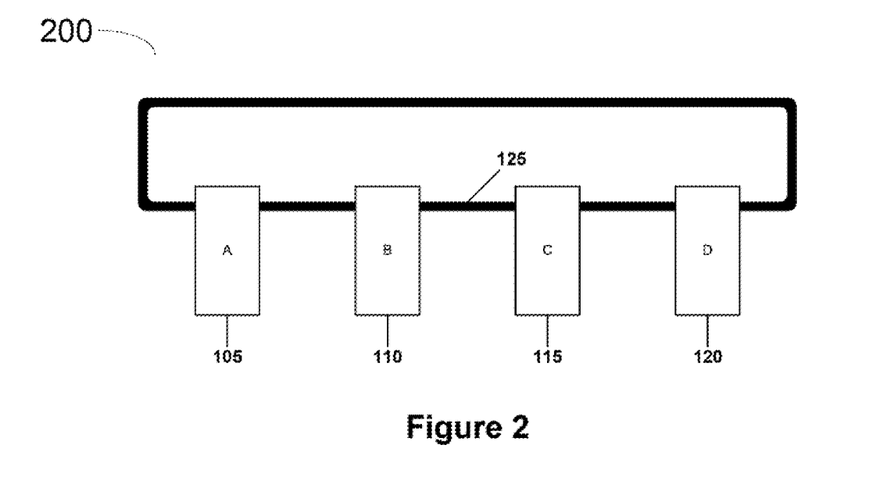
FIG. 2 illustrates exemplary nodes in a ring topology according to an embodiment according to an embodiment.

FIG. 2 illustrates an exemplary TOE network 200 having various nodes arranged in a ring topology. In TOE network 200, a single fiber 125 may link node 105 to node 110, node 110 to node 115, node 115 to node 120 and node 120 back to node 105, thereby forming the ring topography.

As shown in FIG. 2, and similar to TOE network 100 in FIG. 1B, no more than one node may receive packets at a particular wavelength. To continue the above example in FIG. 1B, node 105 may be associated with wavelength A, node 110 may be associated with wavelength B, node 115 may be associated with wavelength C, and node 120 may be associated with wavelength D. As such, the number of nodes in such a ring may be limited to a number of frequencies at which a node can transmit (for a unidirectional fiber). For example, if each node is configured to transmit at sixteen separate and distinct frequencies, then an individual ring may include up to and including sixteen nodes. It should be noted that the TOE network 200 is shown with only four nodes for exemplary purposes.

Generally, the number of individual nodes that may be accommodated by a single optical fiber may be determined by the number of node groups that are supported and the number of nodes supported in each node group. Node groups are discussed in more detail below in the discussion of FIG. 3. Networks designed according to the teachings of the present disclosure may operate over the full fiber optic band range (i.e., 1260 nm to 1675 nm) depending on the availability of devices capable of receiving transmissions over at least a portion of such range.

Figure 3:
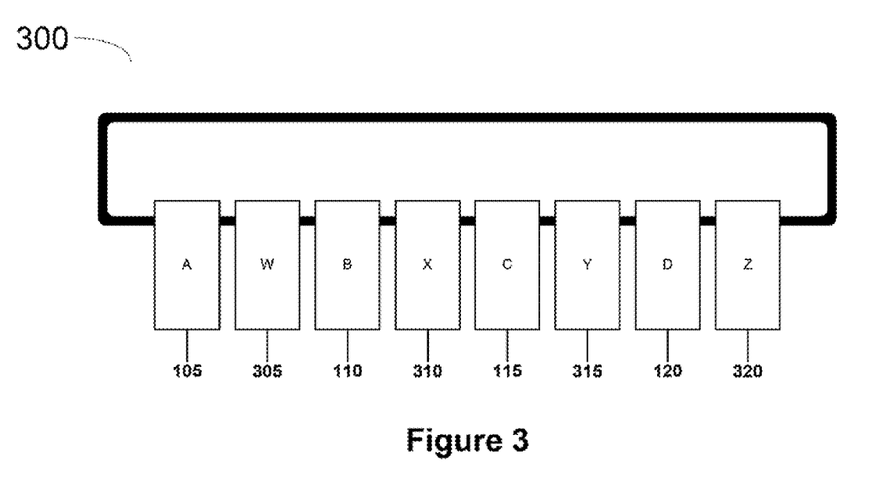
FIG. 3 illustrates an exemplary network architecture including a plurality of node groups according to an embodiment.

FIG. 3 illustrates an exemplary TOE network 300 including a plurality of node groups. Multiple node groups may be supported on a single fiber provided that each node group operates in a different wavelength range. As shown in FIG. 3, nodes 105, 110, 115 and 120 may be in a first node group, and nodes 305, 310, 315 and 320 may be in a second node group. The first node group may operate, for example and without limitation, in the 'C' band (1530-1565 nm as shown in Table 1), and the second node group may operate, for example and without limitation, in the 'L' band (1565-1625 nm as shown in Table 1). For example, node 105 may be associated with wavelength A (e.g., 1530 nm), node 110 may be associated with wavelength B (e.g., 1535 nm), node 115 may be associated with wavelength C (e.g., 1540 nm), and node 120 may be associated with wavelength D (e.g., 1545 nm). Likewise, node 305 may be associated with wavelength W (e.g., 1600 nm), node 310 may be associated with wavelength X (e.g., 1605 nm), node 315 may be associated with wavelength Y (e.g., 1610 nm), and node 320 may be associated with wavelength Z (e.g., 1615 nm).

As such, the nodes in each node group may be optically transparent to the wavelengths of the other node group (and any other node groups on the fiber). Additionally, in one embodiment, each node group may operate at different transmission rates (for example, the first node group may operate at 100 Gbps, and the second node group may operate at 10 Gbps). Thus, for example, node 120 may transmit a packet at wavelength B (e.g., 1535 nm) to node 110 at 100 Gbps. This packet would be optically transparent to each node in the second node group because wavelength B (e.g., 1535 nm) is outside their operational wavelength band (e.g., 1565 to 1625 nm).

In the exemplary network of FIG. 3, the node groups may operate on the same fiber, but communication between the node groups may not occur. Communication between different node groups may depend upon the presence of inter-node group bridging or routing components, such as are discussed below.

Figure 4:
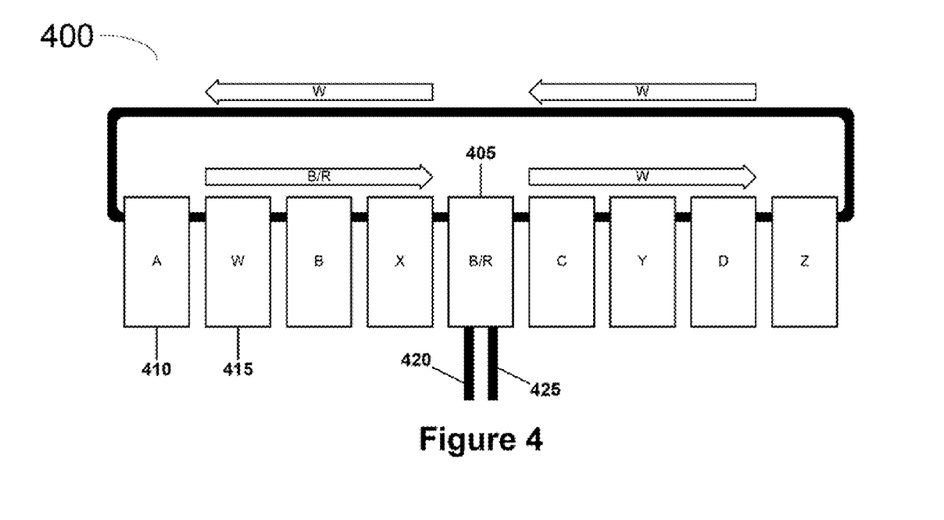
FIG. 4 illustrates an exemplary network architecture including a plurality of node groups and an intergroup bridge or router according to an embodiment.

FIG. 4 illustrates an exemplary TOE network 400 that may include a plurality of node groups and an intergroup bridge/router 405. The bridge/router 405 may be a special node that includes a plurality of transceivers. The bridge/router 405 may have one transceiver for each node group for which bridging or routing functionality is provided. As shown in FIG. 4, node 410 may send a packet of data to node 415 (a node in a different group) by transmitting the packet, along with information indicating the destination of the packet as node 415 at a wavelength B/R assigned to the bridge/router 405. The bridge/router 405 receives and analyzes the packet and determines that the packet is destined for node 415. The bridge/router 405 may then transport the packet at the wavelength W assigned to node 415.

Providing destination addresses, such as media access control (MAC) addresses, for packets and the subsequent routing of packets in a multi-group network, such as the TOE network 400 shown in FIG. 4, may be performed similarly to a single group network, such as TOE network 200 shown in FIG. 2. In a single group network, a node (e.g., node 105) may maintain a mapping table indicating the MAC addresses of each other node in the group (e.g., nodes 110, 115 and 120) along with the associated wavelengths used to communicate with such nodes. A unique mapping table may be maintained at each node. In a multi-group network, the mapping table maintained by a node may include address-wavelength pairs for nodes in its group and other groups. In the case of an address assigned to a destination node in another group, the wavelength assigned to the destination node may correspond to a bridge/router. When the bridge/router receives a packet sent on its associated wavelength having a MAC address for the destination node, the bridge/router may access its own mapping table to determine how to forward the packet. For example, the bridge/router may transmit the packet at a wavelength of the destination node if the destination node is directly accessible from the bridge/router. Alternatively, a first bridge/router may transmit the packet at a wavelength of a second bridge/router if, e.g., the destination node is not directly accessible from the first bridge/router.

In one embodiment, the bridge/router 405 may provide a bridged or routed connection to another network outside TOE network 400. As shown in FIG. 4, the bridge/router 405 further connects to two additional networks via link 420 and link 425. Each link 420, 425 may, for example and without limitation, enable operable communication between the bridge/router 405 and another ring having a plurality of nodes, another bridge/router, a network operating a different protocol, such as an Ethernet network, and/or the like. It should be noted that two additional links are shown for exemplary purposes only. A bridge/router may be operably connected to any number of additional links, thereby establishing communications between a single TOE network and numerous outside networks.

Figure 5:
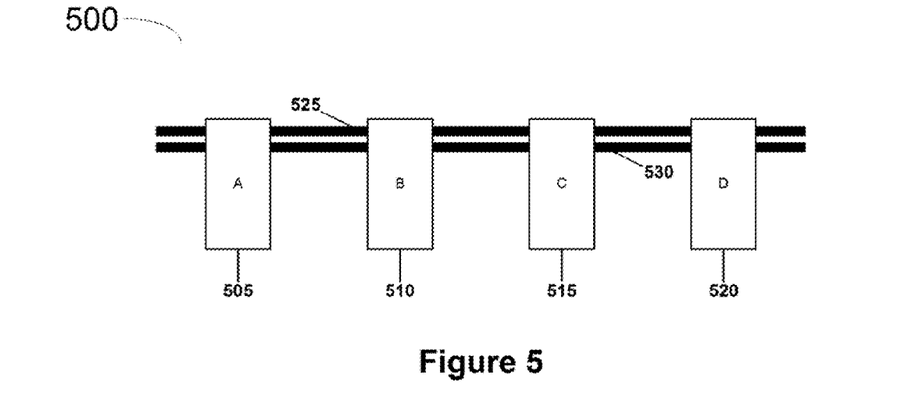
FIG. 5 illustrates an exemplary system level diagram for an alternate network architecture according to an embodiment.

FIG. 5 illustrates a system level diagram for an exemplary TOE network 500. TOE network 500 may include various nodes such as nodes 505, 510, 515 and 520. Each of the nodes 505, 510, 515 and 520 may include, for example, first and second transceivers. The first transceiver may be connected to a first fiber 525, and the second transceiver may be connected to a second fiber 530. In an alternate embodiment, the first fiber 525 and the second fiber 530 may be implemented as a single fiber that supports bidirectional traffic.

Each node 505, 510, 515 and 520 within a group may directly communicate with any other node in the group by transmitting at the appropriate wavelength using either the first fiber 525 or the second fiber 530. In one embodiment, no transmission between two nodes in the same group may be transmitted from the first node in the group (as shown, node 505) along the second fiber 530 or from the last node in the group (as shown, node 520) along the first fiber 525.

Figure 6:
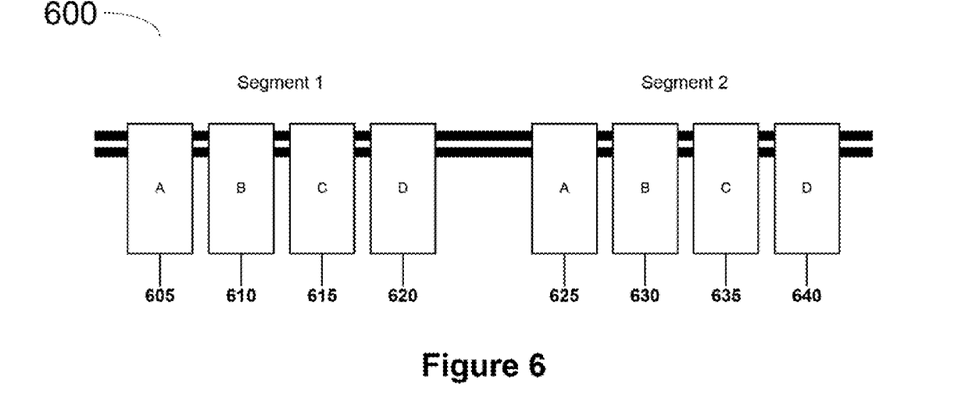
FIG. 6 illustrates an exemplary system level diagram for an alternate network architecture including multiple group segments according to an embodiment.

FIG. 6 illustrates a system level diagram for an exemplary TOE network 600 including multiple group segments. As shown in FIG. 6, if optical signals are constrained to remain within the physical span of a group segment, the same optical fiber may support a plurality of group segments. Each group segment may include a plurality of nodes. In an embodiment, nodes within a group segment, such as segment 1 including nodes 605, 610, 615 and 620 or segment 2 including nodes 625, 630, 635 and 640, may encompass a full range of available wavelengths (e.g., wavelengths A, B, C and D). Moreover, although only one node in each group segment can receive transmissions at a particular wavelength, a plurality of group segments may each have a node that is able to receive transmissions at the particular wavelength, such as 605 and 625 each receiving transmissions at wavelength A.

One limitation of the network architecture in FIG. 6 may be that communication between group segments is limited or impossible because each group segment may contain a group of nodes that are assigned wavelengths covering a full range of available wavelengths. Accordingly, inter-segment bridging/routing may be used to enable communication between group segments.

Figure 7:
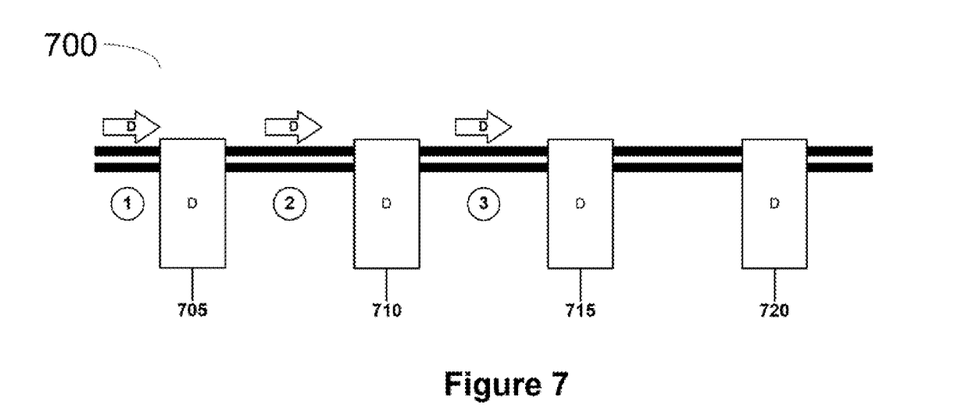
FIG. 7 illustrates exemplary transmission of data through an inter-segment bridging/routing network architecture according to an embodiment.

FIG. 7 illustrates the operation of inter-segment bridging/routing in an exemplary TOE network 700. For simplicity, only nodes capable of receiving transmissions at the same wavelength D as the destination of an exemplary packet are shown. As shown in FIG. 7, a packet originating in segment 1 may be destined for node 715 in segment 3. When the packet arrives at node 705 of segment 1, the node may extract the destination MAC (Media Access Control) address from the packet and compare the address with its own MAC address. If the destination MAC address matches the local MAC address, the node 705 would recognize itself to be the destination, and the packet would not be passed on. If the source MAC address for the packet matches the local MAC address, the node 705 would remove the packet because the packet has traversed the entire network without being delivered. However, since the packet is not destined for node 705, the packet is forwarded in the same direction in this case. This process may repeat at node 710 and node 715, where the packet is ultimately extracted.

Figure 8:
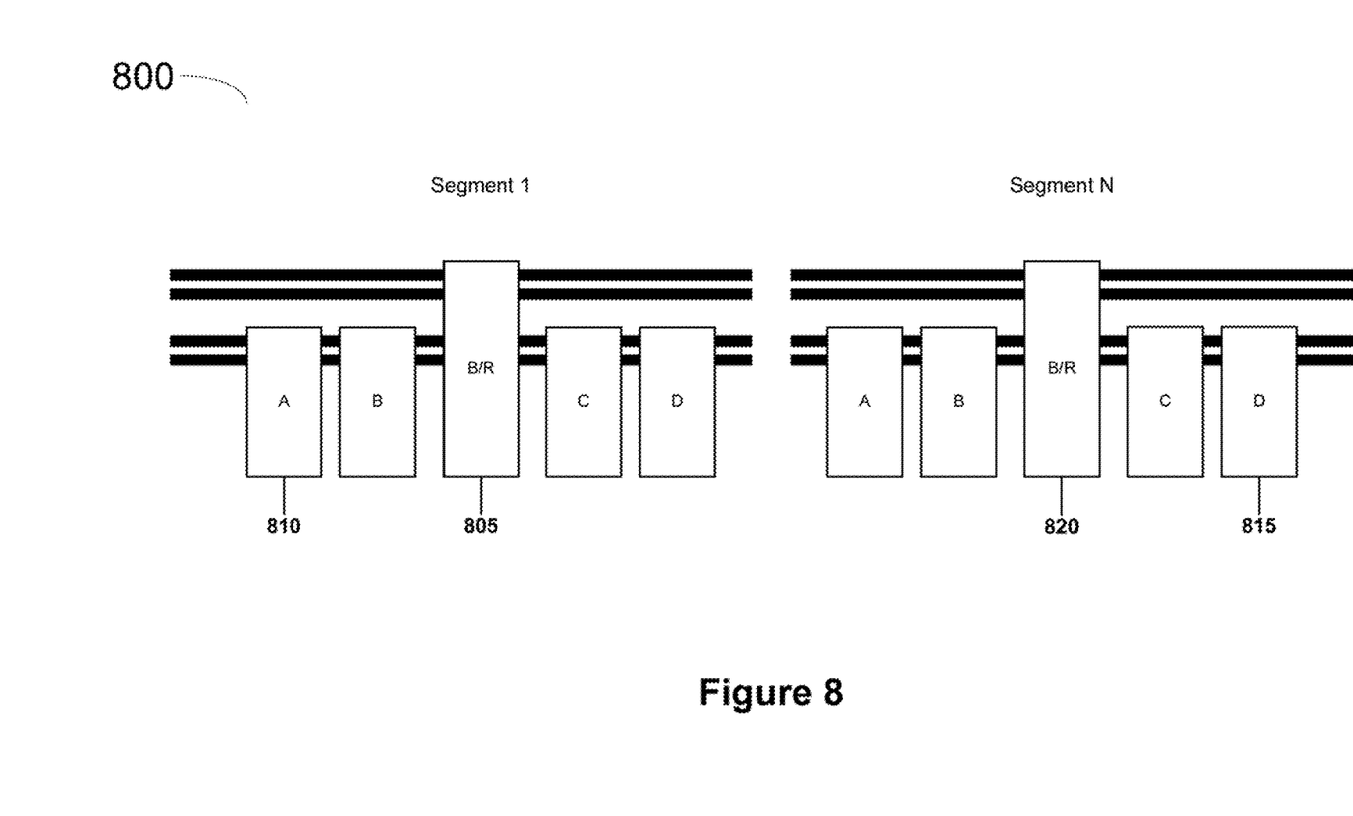
FIG. 8 illustrates an exemplary network architecture for performing inter-group bridging/routing according to an embodiment.

FIG. 8 illustrates an exemplary TOE network 800 for performing inter-group bridging/routing. As shown in FIG. 8, inter-segment group bridges and/or routers 805 and 820 may be used with multi-segment groups. Each segment bridge/router, such as segment bridge/router 805, may be positioned near the center of a group segment, such as segment 1. If node 810 on segment 1 wishes to send a packet to node 815 on segment N, one of a plurality of paths may be used. For example, the packet may be transmitted using inter-segment routing as described above in reference to FIG. 7. Alternately, the packet may be transmitted from node 810 at a first wavelength in a first band, such as the "C" band, corresponding to segment bridge/router 805. Segment bridge/router 805 may receive the packet, determine the segment for which it is intended, and re-transmit it, for example, at a second wavelength in a second band, such as the "L" band, corresponding to segment bridge/router 820. Segment bridge/router 820 may receive the packet, determine the destination node, and retransmit the packet at the wavelength corresponding to node 815.

Although the above description includes the use of a plurality of bands, transmissions may be made within a single band. In addition, FIG. 8 illustrates separate fibers for the segments and the segment bridge/routers. It should be understood that this is for illustration purposes only and that all transmissions may be made on a single fiber. The depiction of a plurality of fibers is merely to emphasize that the segment bridge/routers have fewer hops between the source and destination segments. A plurality of segment bridge/routers capable of intercommunicating may be termed a "super group." Additional levels of hierarchy may be formed within the scope of this embodiment (e.g., super group bridge/routers may interconnect groups of segment bridge/routers, etc.).

It is noted that the use of a dual fiber topology, as depicted in FIGS. 5-8, may not require the use of a dual ring. Benefits, in terms of performance and resiliency, may result from joining the extreme ends to form a ring that may be embodied in a single fiber.

Figure 9:
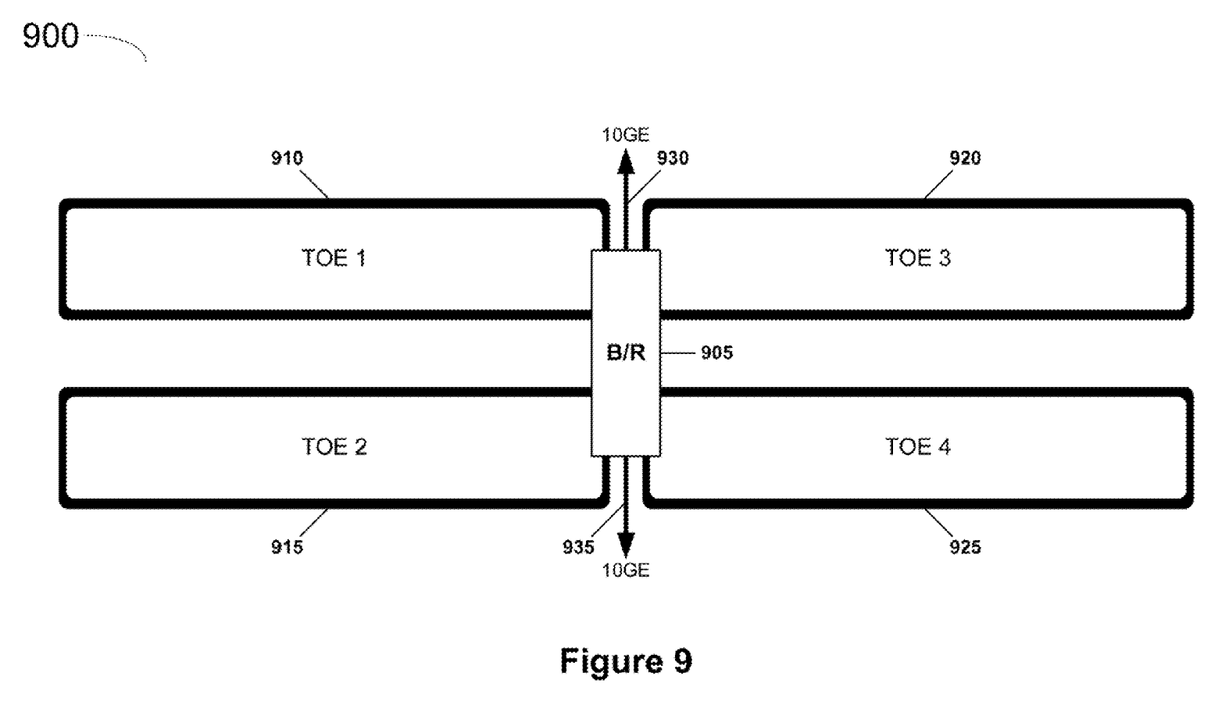
FIG. 9 illustrates an exemplary network architecture including an inter-ring bridge/router according to an embodiment.

FIG. 9 illustrates an exemplary TOE network 900 including an inter-ring bridge/router according to an embodiment. As shown in FIG. 9, an inter-ring bridge/router 905 may interconnect a plurality of independent fiber networks, such as fiber networks 910, 915, 920 and 925. Although inter-ring bridge/router 905 is depicted as connecting four fiber networks, the number of separate networks that an inter-ring bridge/router can support is not limited by this disclosure. In an embodiment, the inter-ring bridge/router 905 may include one or more transceivers for each fiber network. In an embodiment, a segment bridge/router, such as the one illustrated in FIG. 8 may support a super group that includes segments on multiple fiber networks.

In an embodiment, the inter-ring bridge/router 905 may also include one or more ports, such as 930 and 935, connecting to, for example, one or more external Ethernet networks. Such a bridge/router 905 may be used as a gateway between different network protocols.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A system for switching data packets over an optical network, the system comprising:
   a first node group comprising a plurality of first nodes and a first bridge/router having a first routing transceiver, wherein each first node has a first transceiver designed to transmit a data packet at at least one of a plurality of first wavelengths selected only from a first wavelength set and receive a data packet at an assigned first wavelength selected only from the first wavelength set, wherein each first node is configured to ignore incoming data packets not transmitted at its assigned first wavelength, wherein a data packet transmitted at a wavelength that is not within the first wavelength set is optically transparent to each first transceiver;
   a second node group comprising a plurality of second nodes and a second bridge/router having a second routing transceiver, wherein each second node has a second transceiver designed to transmit a data packet at at least one of a plurality of second wavelengths selected only from a second wavelength set and receive a data packet at an assigned second wavelength selected only from the second wavelength set, wherein each second node is configured to ignore incoming data packets not transmitted at the assigned second wavelength, wherein a data packet transmitted at a wavelength that is not within the second wavelength set is optically transparent to each second transceiver, wherein the first wavelength set is mutually exclusive from the second wavelength set;

at least one first fiber configured to carry data packets in a first direction and in a second direction, wherein the at least one fiber connects the first bridge/router to the second bridge/router and only connects the plurality of first nodes to the plurality of second nodes through the first bridge/router and the second bridge/router;

at least one second fiber configured to carry data packets in a first direction and in a second direction, wherein the at least one second fiber connects the plurality of first nodes to the first bridge/router in series; and at least one third fiber configured to carry data packets in a first direction and in a second direction, wherein the at least one third fiber connects the plurality of second nodes to the second bridge/router in series, wherein each of the first and second transceivers is connected such that the transceiver can only directly transmit a data packet through at least one of the second fiber and the third fiber to a transceiver in an adjacent one of the first nodes, or an adjacent one of the second nodes, or a routing transceiver in the first bridge/router or the second bridge/router.

2. The system of claim 1, wherein each first node further comprises a third transceiver configured to transmit and receive data packets.

3. The system of claim 2, wherein each third transceiver is connected such that the third transceiver can only directly transmit a data packet through the at least one second fiber to the first bridge/router.

4. The system of claim 1, wherein the first bridge/router is configured to:
receive a data packet at a wavelength from the first wavelength set;
determine a destination node for the data packet; and
transmit the data packet at a wavelength from the second wavelength set associated with the destination node.

5. The system of claim 4, wherein the first bridge/router is configured to determine a destination node for the data packet by:
identifying a destination address from the data packet; and
using the destination address to identify a wavelength associated with the destination node.

6. The system of claim 1, wherein the first bridge/router is further configured to operably connect to a plurality of third nodes, wherein the first bridge/router and the plurality of third nodes each have a third transceiver configured to transmit a data packet only at at least one wavelength from a third wavelength set and receive a data packet only at an assigned wavelength from the third wavelength set, wherein each third node is configured to ignore incoming data packets not transmitted at the assigned third wavelength, wherein the first transceivers of the first nodes and the second transceivers of the second nodes are not directly connected to any third transceiver.

7. The system of claim 1, wherein the plurality of first nodes and plurality of second nodes are arranged in a ring topology.

8. The system of claim 1, wherein each second node further comprises a third transceiver configured to transmit and receive data packets.

9. The system of claim 8, wherein each third transceiver is connected such that the third transceiver can only directly transmit a data packet through the at least one third fiber to the second bridge/router.

10. The system of claim 1, wherein the second bridge/router is configured to:
receive a data packet at a wavelength from the second wavelength set;
determine a destination node for the data packet; and
transmit the data packet at a wavelength from the first wavelength set associated with the destination node.

11. The system of claim 10, wherein the second bridge/router is configured to determine a destination node for the data packet by:
identifying a destination address from the data packet; and
using the destination address to identify a wavelength associated with the destination node.

12. The system of claim 1, wherein the second bridge/router is further configured to operably connect to a plurality of third nodes, wherein the second bridge/router and the plurality of third nodes each have a third transceiver configured to transmit a data packet only at at least one wavelength from a third wavelength set and receive a data packet only at an assigned wavelength from the third wavelength set, wherein each third node is configured to ignore incoming data packets not transmitted at the assigned third wavelength, wherein the first transceivers of the first nodes and the second transceivers of the second nodes are not directly connected to any third transceiver.

* * * * *